United States Patent [19]
Prikryl

[11] Patent Number: 5,349,175
[45] Date of Patent: Sep. 20, 1994

[54] FOCUS SENSING APPARATUS USING ELECTRICAL AGC TO ENHANCE DIFFERENTIAL FOCUS ERROR SIGNAL

[75] Inventor: Ivan Prikryl, Colorado Springs, Colo.

[73] Assignee: Applied Magnetics Corporation, Goleta, Calif.

[21] Appl. No.: 785,302

[22] Filed: Oct. 30, 1991

Related U.S. Application Data

[63] Continuation-in-part of Ser. No. 597,428, Oct. 15, 1990, abandoned.

[51] Int. Cl.$^5$ .............................................. G11B 7/00
[52] U.S. Cl. ........................... 250/201.5; 369/44.41; 369/44.36
[58] Field of Search .................. 250/201.5, 201.4; 359/638–640, 831, 837, 839; 369/44.29, 44.32, 44.35, 44.36, 44.37, 44.41

[56] References Cited

U.S. PATENT DOCUMENTS

| | | |
|---|---|---|
| 2,432,432 | 12/1947 | MacNeille . |
| 3,536,375 | 10/1990 | Mansell . |
| 3,652,167 | 3/1972 | Smith . |
| 3,677,621 | 7/1972 | Smith . |
| 3,844,638 | 10/1974 | Lingenfelder et al. . |
| 3,922,069 | 11/1975 | Kishikawa et al. . |
| 3,976,828 | 8/1976 | Jansen . |
| 3,992,574 | 11/1976 | Bouwhuis et al. . |
| 4,123,652 | 10/1978 | Bouwhuis . |
| 4,253,723 | 3/1981 | Kojima et al. . |
| 4,334,300 | 6/1982 | Arquie et al. . |
| 4,358,200 | 11/1982 | Heemskerk et al. . |
| 4,399,529 | 8/1983 | Leterme et al. . |
| 4,411,492 | 10/1983 | Bluege . |
| 4,411,500 | 10/1983 | Yonezawa et al. . |
| 4,422,168 | 12/1983 | Ito et al. . |
| 4,423,495 | 12/1983 | Musha et al. . |
| 4,423,496 | 12/1983 | Opheij et al. . |
| 4,425,636 | 1/1984 | Musha et al. . |
| 4,441,175 | 4/1984 | Shuman . |
| 4,447,722 | 5/1984 | Saimi . |
| 4,449,213 | 5/1984 | Noborimoto et al. . |
| 4,450,547 | 5/1984 | Nakamura et al. . |

(List continued on next page.)

FOREIGN PATENT DOCUMENTS

| | | |
|---|---|---|
| 0259148 | 9/1987 | European Pat. Off. . |
| 0219640 | 11/1985 | Japan . |
| 0271631 | 12/1986 | Japan . |
| 0289539 | 12/1986 | Japan . |

OTHER PUBLICATIONS

Bouwhuis, et al., "Read-out of Optical Disk" in Principles of Optical Disk Systems, Adam Hilger Ltd., Bristol and Boston, pp. 70–80 (1985).

(List continued on next page.)

Primary Examiner—David C. Nelms
Assistant Examiner—Stephone B. Allen
Attorney, Agent, or Firm—Knobbe, Martens, Olson & Bear

[57] ABSTRACT

A focus sensing apparatus for determining the focus of an illuminating beam relative to an optical disk is disclosed herein. In one preferred embodiment, a light source generates a linearly polarized beam which is collimated by a collimating lens. The collimated beam is then converged by an objective lens onto the surface of the optical disk. The disk reflects the illuminating beam focused thereon back through the objective lens to a polarization beam splitter. A portion of the optical energy incident on the beam splitter is then redirected to form a servo beam, wherein the degree of collimation of the servo beam is indicative of the focus position of the illuminating beam. A beam separation module having a reflectivity which varies in response to the angle of incidence of optical energy thereon is positioned to intercept the servo beam. The beam separation module is operative to separate the servo beam into two beams which could be transmitted and reflected beams of substantially similar shape and intensity. Electrical signals produced by photodetective elements in response to incidence of the transmitted and reflected beams thereon may then be used to differentially generate a focus error signal. Gain control circuitry is provided to compensate for asymmetrical changes in beam intensity and maintain balanced detector channels during the generation of the differential focus error signal.

23 Claims, 3 Drawing Sheets

U.S. PATENT DOCUMENTS

| | | |
|---|---|---|
| 4,453,239 | 6/1984 | Musha et al. . |
| 4,455,085 | 6/1984 | Kato et al. . |
| 4,458,980 | 7/1984 | Ohki et al. . |
| 4,475,182 | 10/1984 | Hosaka . |
| 4,489,408 | 9/1985 | Verhoeven et al. . |
| 4,497,534 | 2/1985 | Sincerbox . |
| 4,502,783 | 3/1985 | Lau et al. . |
| 4,504,935 | 3/1985 | Jansen . |
| 4,504,938 | 3/1985 | Tajima . |
| 4,507,766 | 3/1985 | Saimi et al. . |
| 4,514,837 | 4/1985 | Van Rosmalen . |
| 4,525,625 | 6/1985 | Abe . |
| 4,542,492 | 9/1985 | Leterme et al. . |
| 4,587,644 | 5/1986 | Fujjie . |
| 4,596,444 | 6/1986 | Ushida . |
| 4,611,317 | 9/1986 | Takeuchi et al. . |
| 4,612,437 | 9/1986 | Ohsato . |
| 4,614,863 | 9/1986 | Sato . |
| 4,624,526 | 11/1986 | Tsukai et al. . |
| 4,641,926 | 2/1987 | Shirasaki . |
| 4,644,516 | 2/1987 | Musha . |
| 4,669,073 | 5/1987 | Wakabayashi et al. . |
| 4,669,823 | 6/1987 | Iguma et al. . |
| 4,689,481 | 8/1987 | Ono . |
| 4,689,779 | 8/1987 | Hayashi et al. . |
| 4,691,098 | 9/1987 | Maeda . |
| 4,694,447 | 9/1987 | Cohen et al. . |
| 4,701,603 | 10/1987 | Dakin et al. . |
| 4,707,648 | 11/1987 | Minami . |
| 4,707,817 | 11/1987 | Yoshio . |
| 4,716,559 | 12/1987 | Hine . |
| 4,730,294 | 3/1988 | Funada . |
| 4,730,295 | 3/1988 | Bressers . |
| 4,733,065 | 3/1988 | Hoshi et al. . |
| 4,740,946 | 4/1988 | Yumara et al. . |
| 4,763,314 | 8/1988 | MacCaslin et al. . |
| 4,774,698 | 9/1988 | Henmi et al. ............... 369/44.36 |
| 4,794,586 | 12/1988 | Korth . |
| 4,797,868 | 1/1989 | Ando . |
| 4,819,220 | 4/1989 | Myazaki et al. . |
| 4,823,335 | 4/1989 | Shikama et al. . |
| 4,823,336 | 4/1989 | Inada et al. . |
| 4,862,442 | 8/1989 | Tadokoro et al. . |
| 4,876,680 | 10/1989 | Misawa et al. . |
| 4,888,756 | 12/1989 | Shikichi et al. ............ 369/44.35 |
| 4,890,273 | 12/1989 | Takeuchi et al. . |
| 4,891,798 | 1/1990 | Shinikai . |
| 4,899,327 | 2/1990 | Bates et al. . |
| 4,911,534 | 3/1990 | Henegouwen et al. . |
| 4,922,477 | 5/1990 | Miura . |
| 4,937,440 | 6/1990 | Hofer et al. . |
| 5,077,718 | 12/1991 | Matsushita ................ 369/44.35 |
| 5,159,589 | 10/1992 | Oshato ...................... 369/44.35 |

OTHER PUBLICATIONS

Bouwhuis et al., "Recording and Reading of Information on Optical Disks", in Applied Optics and Optical Engineering, R. R. Shannon and J. C. Wyant, eds., Academic Press, Inc., New York, vol. IX, pp. 101–110 (1983).

Cohen et al., "Automatic Focus Control: The Astigmatic Lens Approach", in Applied Optics, vol. 23, pp. 565–570, Feb. 15, 1984.

Yamamoto et al., "Optical Pregroove Dimensions: Design Considerations", in Applied Optics, vol. 25, No. 22, pp. 4031–4034, Nov. 15, 1986.

Arai et al., "New Focusing Method for Draw-Type Optical Head" in Optical Data Storage, Optical Society of America, Washington, D.C., pp. 1–4, Oct. 15–17, 1985.

Equichi et al., "An 86 mm magneto-optical disk drive with a compact and fast-seek-time optical head", from the Optical Data Storage Conference, Vancouver, Mar. 1990.

Prototype Specification Sheet for a magneto-optical disk drive, by Hitachi.

Product Brochure for the Model SMO-501 Optical Disk Drive, by Sony.

Yoshizumi et al., "Fast Access Actuator for Optical Disk Memory", SPIE, pp. 1–4, 1985.

Product Brochure for the Model NE-5001 Half Height Optical Disk Drive, Nov., 1989 by the Nissho Electronics Corporation.

Yamanaka et al., "Compact Magneto-Optical Disk Head Integrated with Chip Elements", OSA/SPIE/IEEE 1991 Technical Digest Series, vol. 5, pp. 138–141, Feb. 25–27, 1991.

Musha et al., "An Optical Head for Digital Audio Discs (DAD)", Research Dept., Research and Development Division, Olympus Optical Co., Ltd. 2951, Ishikawa-cho, Hachioji-shi, Tokyo, Japan 192.

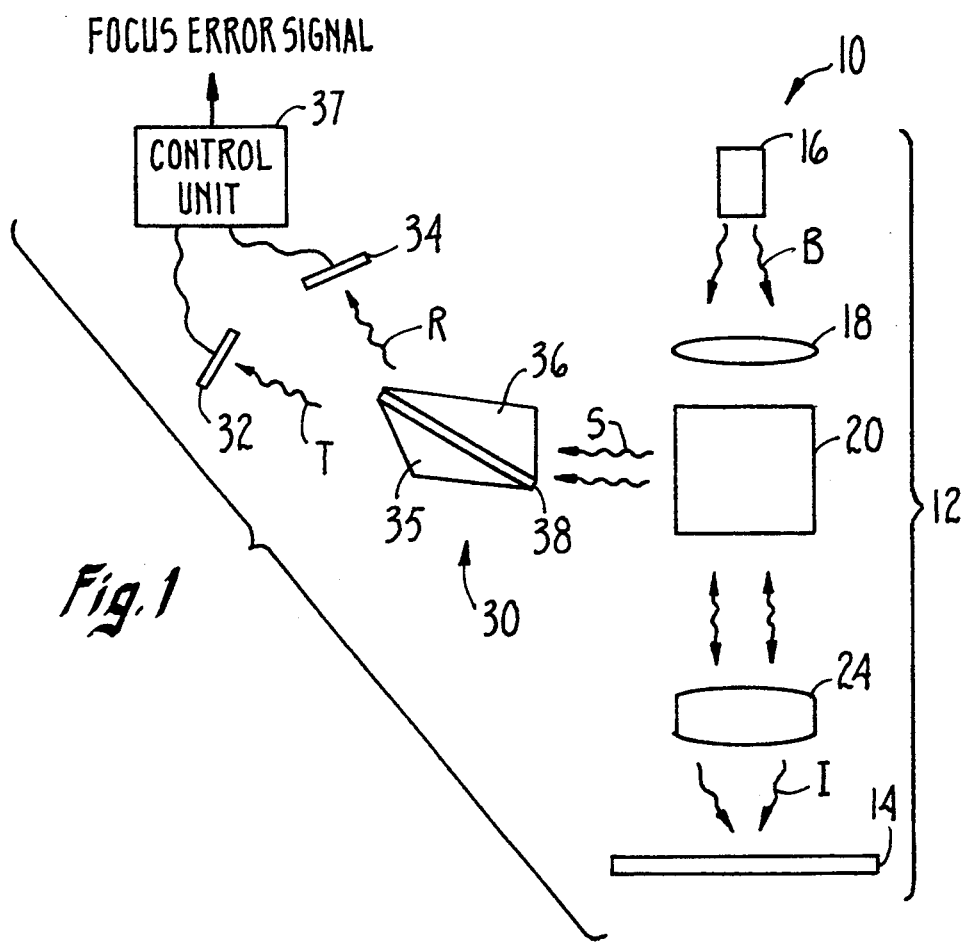
Fig. 1
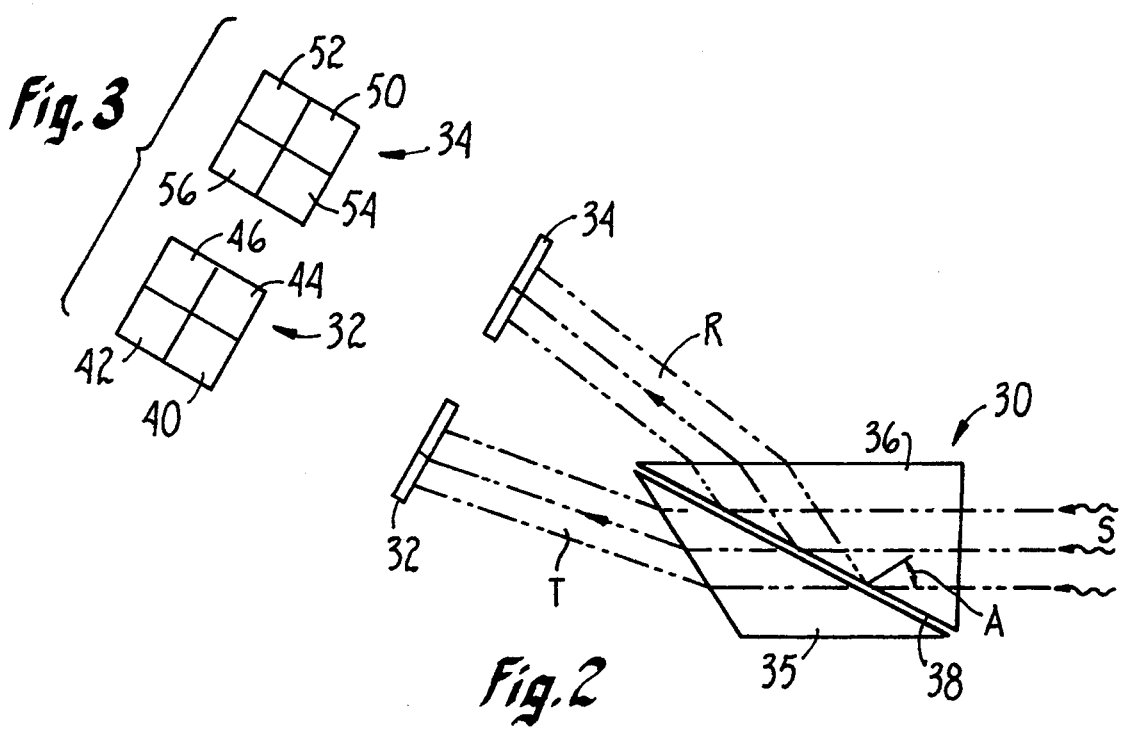
Fig. 3
Fig. 2

FOCUS SENSING APPARATUS USING ELECTRICAL AGC TO ENHANCE DIFFERENTIAL FOCUS ERROR SIGNAL

RELATED APPLICATIONS

This application is a continuation-in-part of parent patent application Ser. No. 07/597,428, now abandoned, filed on Oct. 15, 1990, inventor Prikryl et al., and entitled FOCUS SENSING APPARATUS USING FRUSTRATED TOTAL REFLECTION.

BACKGROUND OF THE INVENTION

1. Field of the Invention

The present invention relates generally to optical recording and playback systems. In particular, the present invention relates to arrangements used to monitor the focus position of a light beam with respect to an optical disk.

2. Background of the Invention

Optical recording and playback systems, such as those utilizing optical memory disks, compact disks, or video disks, require precise focusing of an illuminating optical beam through an objective lens onto the surface of an optical disk. The incident illuminating beam is generally reflected back through the objective lens, and is then used to read information stored on the disk. Subsequent to passing back through the objective lens, a portion of the reflected beam is typically directed to an apparatus designed to gauge the focus of the illuminating beam on the disk. Information extracted from the reflected beam by this apparatus may then be used to adjust the focus of the illuminating beam by altering the position of a movable objective lens relative to the disk.

A number of techniques for detecting the focus of an illuminating optical beam are known. For example, U.S. Pat. No. 4,423,495, U.S. Pat. No. 4,425,636 and U.S. Pat. No. 4,453,239 employ what has been termed the "critical angle prism" method of determining beam focus. In this method an illuminating beam reflected from a storage disk is made incident upon a detection prism surface which is set very close to a critical angle with respect to the reflected illuminating beam. When the focus of the illuminating beam on the surface of the disk deviates from a desired state, the variation in the amount of optical energy reflected by the detection prism surface may be used to derive a focus error signal that is then used to adjust the focus of the illuminating beam. The critical angle prism method generally requires that the orientation of the detection prism surface relative to the reflected illuminating beam be precisely adjusted. This requirement arises as a result of discontinuities in the reflectivity characteristic of the detection prism in the neighborhood of the critical angle and makes focus error detection systems based on this method extremely sensitive.

Differential focusing systems are increasingly important because they allow cancellation of certain types of noise that can occur in optical disk drives. The critical angle method is unsuited to differential operation for two reasons. First, the transmitted beam produced by the sensing prism is compressed along one axis, making it unsymmetrical with the reflected beam. Symmetry of the two beams is preferred in a differential system to optimize the noise-cancellation properties in varied environments. Second, at the point on the reflectivity curve of a critical angle prism where the intensities of the two beams are balanced, the slope is far too low to produce a useful differential focus error signal.

A focus detecting apparatus which requires somewhat less precise adjustment of the optical surface on which the reflected illuminating beam is incident, when compared to the critical angle technique is disclosed in U.S. Pat. No. 4,862,442. In particular, the optical surface described therein comprises a dielectric multilayer coating having a reflectivity which varies continuously with respect to the angle of incidence of the reflected illuminating beam. It follows that rotational maladjustment of the surface comprising the multilayer coating will have minimal effect on the value of the focus error signal. However, inaccuracies in the focus error signal produced by multilayer dielectric systems may develop in response to relatively slight changes in the wavelength of the reflected illuminating beam. Such sensitivity to wavelength changes is undesirable since the focus error signal is designed to relate solely to the focus of the illuminating beam.

In addition, certain systems using a dielectric multilayer reflecting surface provide focus error signals having only a limited degree of sensitivity. For example, FIG. 2 of U.S. Pat. No. 4,862,442 shows a particular reflectivity characteristic for a layered dielectric reflecting surface, with the slope of the reflectivity characteristic being proportional to the sensitivity of the focus error signal. The disclosed reflected intensity ranges in value from approximately 0.75 to 0.05 over angles of incidence extending from 42 to 48 degrees. This reflectivity change of approximately 10% per degree produces a focus error signal of relatively low sensitivity.

Accordingly, a need in the art exists for an optical arrangement characterized by a reflectivity profile which allows generation of a highly sensitive focus error signal relatively immune to chromatic aberration, and which is capable of use in differential systems.

SUMMARY OF THE INVENTION

The present invention comprises an improved apparatus and method for radiation beam geometry evaluation, and provides a focus detection apparatus designed to satisfy the aforementioned needs. The inventive focus sensing apparatus includes a beam separation module which provides a pair of well-balanced beams, either of which may be used to produce a focus error signal, and which also may be used together to produce a differential focus error signal. Moreover, certain physical parameters of the beam separation module may be varied to adjust the dynamic range of the apparatus and its sensitivity to changes in the focus of an illuminating beam.

Accordingly, the present invention relates to a focus sensing apparatus comprising: a substantially monochromatic light source, an optical focusing arrangement including an objective lens, a beam separation module, and a photodetective element. In one preferred embodiment of the present invention, the light source generates a substantially linearly polarized beam which is collimated by a collimating lens. The collimated beam is directed by an optical beamsplitting arrangement to an objective lens, which then converges the beam onto the surface of the optical disk. The disk reflects the beam focused thereon back through the objective lens to the beamsplitting arrangement. A portion of the optical energy incident on the beamsplitting arrangement is then redirected to form a servo beam, with the beam separation module being positioned to intercept the servo beam. The beam separation module is operative to separate the servo beam into two beams, for instance transmitted and reflected beams, of preferably similar shape and intensity. Electrical signals produced by photodetective elements in response to variations in the intensity profiles of the transmitted and reflected beams may then be used to differentially generate a focus error signal.

In a particular preferred embodiment of the present invention the beam separation module is a "frustrated total reflection" (FTR) prism which includes a separation layer which is sandwiched between a pair of glass members. The index of refraction of the separation layer is selected to be less than that of the surrounding glass, with the chosen indices of refraction defining the appropriate angle at which the FTR prism separation module should be positioned relative to the servo beam. In addition, the thickness of the separation layer may be adjusted in accordance with the desired sensitivity of the differential focus error separation.

In a further aspect of the invention, gain control circuitry is provided to remove asymmetric changes in beam intensity unrelated to the focus condition of the beam upon the optical disk. In this manner, crosstalk and noise introduced during generation of the focus error signal is minimized and the resulting signal is independent of thermal and vibrational disturbances.

These and other objects and features of the present invention will become more fully apparent from the following description and appended claims taken in conjunction with the accompanying drawings.

BRIEF DESCRIPTION OF THE DRAWINGS

FIG. 1 is a block diagrammatic representation of a preferred embodiment of the beam focus sensing apparatus of the present invention.

FIG. 2 is a magnified top cross-sectional view of a differential version of the inventive beam separation module (FTR prism).

FIG. 3 is an illustrative front view of the first and second quad detectors included within the inventive focus sensing apparatus.

DETAILED DESCRIPTION OF THE PREFERRED EMBODIMENTS

Figure 4:
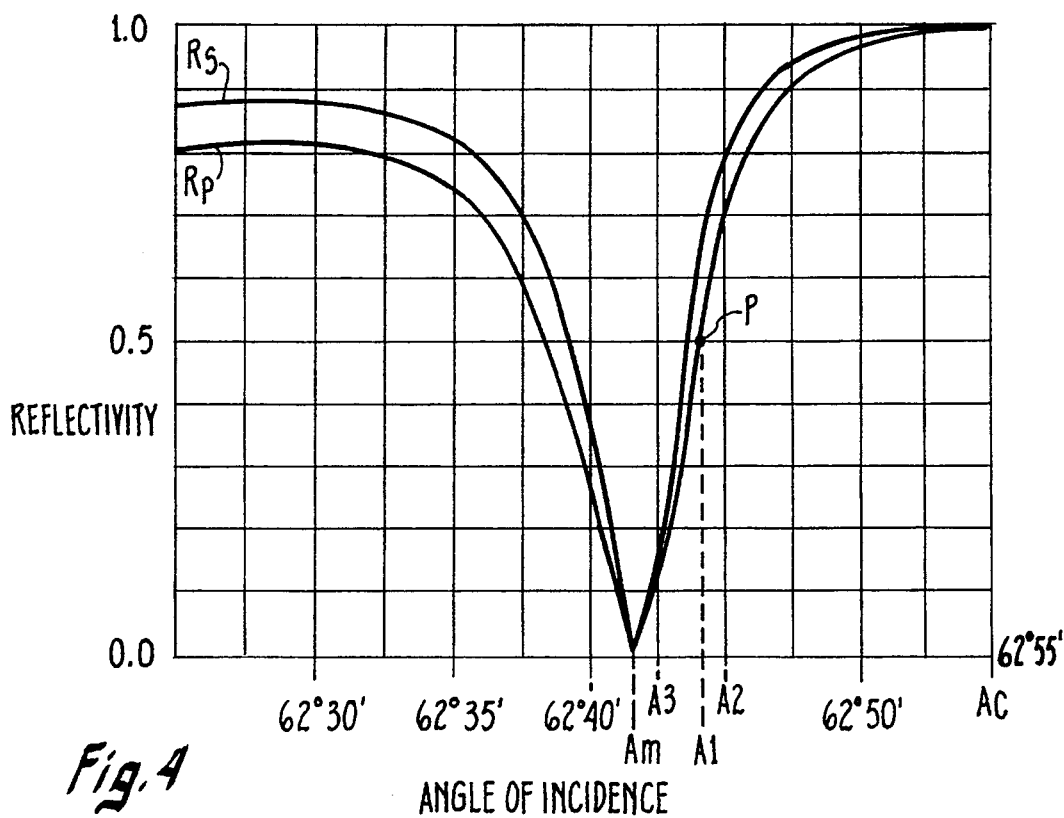
FIG. 4 is a graph showing the reflectivity of the FTR prism beam separation module as a function of the angle of incidence of the servo beam.

FIG. 1 is a block diagrammatic representation of a preferred embodiment of the beam focus sensing apparatus 10 of the present invention. The apparatus 10 includes an optical arrangement 12 for providing a servo beam S indicative of the focus of an illuminating beam I upon an optical disk 14. The servo beam S comprises a portion of the illuminating beam I reflected by the disk 14. Techniques for generating such a servo beam are well known to those skilled in the art. For example, an optical system such as the optical arrangement 12 for generating the servo beam S is described in U.S. Pat. No. 4,862,442, which is herein incorporated by reference. A brief summary of the operation of the optical arrangement 12 is set forth below.

As shown in FIG. 1, the optical arrangement 12 includes a laser source 16 which generates a linearly polarized beam B. The beam B is collimated by a collimating lens 18, and the collimated beam is directed by an optical beamsplitting arrangement 20 such as a prism cluster, to an objective lens 24. The collimated beam is then converged by the objective lens 24 onto the surface of the optical disk 14. The optical disk may, for example, comprise a compact disk, video disk, or optical memory disk. The disk 14 reflects the illuminating beam focused thereon back through the objective lens 24 to beamsplitting arrangement 20. Those skilled in the art will appreciate that the beamsplitting arrangement 20 may include a first beamsplitter (not shown) to redirect a first portion of the reflected illuminating beam in order to form the servo beam S. The beamsplitting arrangement 20 will also generally include a second beamsplitter (not shown) to redirect a second portion of the reflected illuminating beam to create a data beam. Such a data beam carries information stored on the optical disk 14. The servo beam S is intercepted by the FTR prism beam separation module 30, the design and construction of which is discussed more fully hereinafter.

As is also described more fully below, the servo beam S is divided into a transmitted beam T and a reflected beam R by the FTR prism beam separation module 30. In the embodiment of FIG. 1 the transmitted and reflected beams T,R are of substantially equal cross section and intensity. The transmitted beam T is incident on a first quad detector 32, while the reflected beam R is incident on a second quad detector 34. One preferred quad detector for use in the present invention is identified as a PIN photodiode, for example, a PN324E or PN3405 quad photodiode made by Panasonic. Electrical signals produced by the quad detectors 32, 34 in response to the intensity distributions of the transmitted and reflected beams T, R are utilized by a control unit 37 to generate a differential focus error signal (DFES) indicative of the focus of the illuminating beam I on the disk 14. One preferred embodiment of a control unit 37 and associated method for generating the DFES is discussed hereinafter. The focus error signal may, for example, be used to control a mechanical arrangement (not shown) disposed to adjust the focus of the illuminating beam I by altering the displacement of the objective lens 24 relative to the disk 14.

FIG. 2 shows a magnified top cross-sectional view of the FTR prism beam separation module 30. The prism module 30 includes first and second optical members 35, 36 which sandwich a separation layer 38. The optical members 35, 36 may be realized from glass having an index of refraction larger than that of the separation layer 38. For example, in one preferred embodiment the optical members 35, 36 may be manufactured from glass having an index of refraction of 1.55, while the separation layer 38 is composed of a solid such as either magnesium fluoride ($MgF_2$) or fused silica ($SiO_2$) having indices of refraction of 1.38 and 1.48, respectively. The separation layer 38 need not consist of a solid, and may be realized from a liquid or air provided that the optical members 35, 36 are of a larger index of refraction.

A brief description of the physics of the interaction of the light in beam S with layer 38 is as follows. If layer 38 and optical member 35 are not present, the well-known phenomenon of total internal reflection takes place at the hypotenuse face of optical member 36, sending all of beam S in the direction of beam R. However, some light energy exists behind the hypotenuse face of optical member 36 in the form of "evanescent waves", which do not propagate. When optical member 35 is brought close enough to optical member 36, this energy is coupled without loss into member 35 and propagates in the direction of beam T. This phenomenon is known as frustrated total reflection (FTR). In this condition, if the FTR prism is disposed with respect to beam S such that the incidence angle A of beam S at separation layer 38 is close to the region of frustrated total reflection, the transmission and reflection curves will have very steep slopes (angular sensitivities). This allows the fabrication of a very sensitive focus sensing system. Further, the transmission and reflection curves for such a system based on the FTR principle will be relatively insensitive to the wavelength of the light in beam S, as compared to the curves of a multilayer structure.

The prism module 30 may be fabricated by first depositing the separation layer on either of the optical members via conventional thin film techniques. The complementary optical member may then be affixed to the exposed surface of the separation layer with an optical glue such as type N61 manufactured by Norland, Inc. Although the indices of refraction of the first and second optical members 35, 36 will generally be chosen to be identical, differing indices of refraction may also be selected. In the preferred embodiment, the first and second optical members have identical indices of refraction in such a geometry that the transmitted and reflected beams T and R are of substantially equal cross-section and intensity.

The inclusion of the separation layer 38 between the first and second glass members 35, 36 is designed to provide transmitted and reflected beams T, R of substantially similar cross section. As shown in FIG. 3, the transmitted and reflected beams are both derived from the servo beam S. Since components of the servo beam S are transmitted and reflected into media having identical indices of refraction subsequent to incidence on the separation layer 38, it follows that the optical energy within the beams T, R will be arranged in beams of substantially similar shape.

As shown in the illustrative front view of FIG. 3, the first quad detector 32 includes first, second, third and fourth photodetective elements 40, 42, 44, 46, respectively, which produce electrical signals hereinafter referred to as T1, T2, T3, and T4 in response to the intensity of the transmitted beam T impinging thereon. Similarly, the second quad detector 34 includes fifth, sixth, seventh and eighth photodetective elements 50, 52, 54, 56, respectively, which provide electrical signals hereinafter referred to as R1, R2, R3 and R4 in response to incidence of the reflected beam R. The photodetective elements may be realized by PIN diodes, wherein the level of the electrical output from each diode is proportional to the optical energy received thereby.

When the objective lens 24 (FIG. 1) is situated relative to the disk 14 such that the illuminating beam I is properly focused, the rays included within the servo beam are well collimated (i.e. substantially parallel) and are therefore incident on the separation layer 38 at a substantially identical angle $A_1$ shown in FIG. 2. Contrary to this, when the objective lens 24 does not focus the illuminating beam in the plane occupied by the surface of the disk 14 the rays comprising the servo beam S will be either mutually convergent or divergent. It follows that all rays within the servo beam S will impinge on the separation layer 38 at the substantially same angle when the illuminating beam I is suitably focused, while rays of a different range of angles of incidence will address the separation layer 38 when the beam I is out of focus.

The prism module 30 is designed such that the reflectivity and transmissivity of the separation layer 38 is extremely sensitive to the angle at which optical energy is incident on the separation layer 38. Thus, the spatial distribution in the intensity of the transmitted and reflected beams T, R will vary as the focus position of the illuminating beam I varies relative to the surface of the disk 14. That is, an illuminating beam I which is properly focused gives rise to a well collimated servo beam S such that all the rays thereof experience the same degree of reflection by the separation layer 38. Accordingly, the transmitted and reflected beams T, R will be of substantially uniform intensity when the illuminating beam I is appropriately focused. Conversely, a convergent or divergent servo beam S will engender transmitted and reflected beams T, R of nonuniform spatial intensity distributions since the rays within the servo beam S will be subject to a variety of degrees of reflection by the separation layer 38. By detecting these spatial variations in the intensity of the transmitted and reflected beams the photodetectors 32, 34 produce electrical signals which may be utilized to produce a DFES indicative of the focus position of the illuminating beam I.

The manner in which a DFES may be synthesized in response to the degree of collimation of the servo beam S may be further understood with reference to FIG. 4. FIG. 4 is a graph showing the reflectivity (intensity of beam R/intensity of beam S) of the FTR prism beam separation module 30 as a function of the angle of incidence of rays within the servo beam S relative to the separation layer 38. Specifically, the graph of FIG. 4 depicts the reflectivities Rs and Rp of the module 30 in response to illumination by both s-polarized and p-polarized optical energy of wavelength 0.78 microns. The reflectivity profiles of FIG. 4 pertain to a FTR prism beam separation module 30 having a separation layer with a thickness of 4.5 microns and an index of refraction of 1.38, with the separation layer being sandwiched by glass members having an index of refraction of 1.55. As shown in FIG. 4, the prism module 30 is preferably positioned relative to the servo beam S at an angle of incidence $A_1$ such that the module 30 is operative about a working point P. That is, at the working point P the module 30 is positioned such that an illuminating beam I properly focused on the disk 14 engenders a well collimated servo beam S having rays which impinge on the separation layer 38 at the angle $A_1$. Since the reflectivity of the module 30 is approximately 0.5 at the operating point P, the transmitted and reflected beams produced by the module 30 are of substantially identical average intensity.

When the separation between the objective lens 24 and the disk 14 varies such that the servo beam S decollimates in either a convergent or divergent manner, a first portion thereof will impinge on the separation layer 38 at an angle of incidence larger than the angle $A_1$. For example, at an angle of incidence of $A_2$ (FIG. 4) a corresponding portion of the servo beam will experience a reflectivity of approximately 0.7. Since the first servo beam portion is subject to a reflectivity of only 0.5 when the servo beam S is well collimated, the regions of the detectors 32, 34 which receive the parts of the reflected and transmitted beams R, T derived from the first servo beam portion will collect more and less optical energy, respectively, than when the illumination beam I is properly focused. Similarly, the areas of the detectors 32, 34 in optical alignment with parts of the transmitted and reflected beams T, R arising from a second portion of the servo beam S incident on the separation layer 38 at an angle of incidence $A_3$ (smaller than the angle $A_1$) will be illuminated by more and less optical energy, respectively, than in a condition of proper focus. The DFES is produced in response to electrical signals engendered by the photodetectors 32, 34 indicative of this spatial nonuniformity in the intensity distribution of the transmitted and reflected beams T, R. Moreover, since in the preferred embodiments described herein the module 30 is optically nonabsorbing, variation in the intensity of the transmitted beam T arising from a change in the angle of incidence of a portion of the servo beam S is mirrored by an equal, oppositely directed variation in the magnitude of the part of the reflected beam R engendered by the identical servo beam portion.

Non-differential error signals may be generated independently from either the transmitted or reflected beam, using the equations:

$$\text{FES(transmitted)} = (T1 + T2) - (T3 + T4) \qquad [1]$$

$$\text{FES(reflected)} = (R1 + R2) - (R3 + R4) \qquad [2]$$

In the differential system, the differential focus error signal (DFES) is generated by the control unit 37 in accordance with the following expression:

$$\text{DFES} = (R1 + R2 + T3 + T4) - (T1 + T2 + R3 + R4) \qquad [3]$$

The control unit 37 includes circuitry suitable for carrying out the arithmetic operations of equation [3] and for generating a DFES based on these operations. Preamplifiers (not shown) are included to amplify the electrical signals from the photodetectors 32, 34 prior to processing by the control unit 37.

The manner in which a focus error signal may be derived from the relationship existing between decollimation of the servo beam and the focus position of the illuminating beam is well understood for the case of a single quad photodetector and is disclosed in, for example, U.S. Pat. No. 4,707,648. Utilizing the dual quad photodetector arrangement described herein leads to the synthesis of differential focus error signals having a reduced sensitivity to certain beam imperfections not induced by inaccuracies in the focus position of the illuminating beam relative to the disk 14. Since a localized decrease in the intensity of the servo beam S unrelated to the focus position of the illuminating beam affects the detectors 32 and 34 in a substantially similar manner, such a decrease does not affect the value of the DFES due to the corresponding cancellation which occurs in equation [3]. Although a focus error signal could be derived from either the transmitted or reflected beam alone, the differential detection technique described herein reduces the influence of certain types of beam imperfections.

As mentioned in the Background of the Invention, prior focusing systems were generally ill-equipped to implement the differential focus sensing scheme described by equation [3]. In particular, a feature of the present invention lies in the ability of the beam separation module 30 to provide transmitted and reflected beams of substantially similar cross section and intensity such that both may contribute to the synthesis of a DFES.

In addition to providing a DFES for maintaining the focus of the illuminating beam I in the direction normal to the surface of the disk 14, the electrical outputs from the photodetectors 32, 34 may also be used by the control unit 37 to generate a tracking error signal (TES). The TES is indicative of the radial focus position of the illuminating beam I relative to the conventional spiral or concentric guiding tracks (not shown) imprinted on the surface of the disk 14. The TES enables the beam I to follow the guiding tracks despite eccentricities therein by controlling a mechanical arrangement (not shown) operative to adjust the radial position of the objective lens 24 relative to the disk 14. The TES is calculated by the control unit 37 on the basis of electrical outputs from the photodetectors 32, 34 in accordance with the following equation:

$$\text{TES} = (T1 + T3 + R3 + R1) - (T2 + T4 + R2 + R4) \qquad [4]$$

Again, the manner in which a tracking error signal may be derived from the relationship existing between decollimation of the servo beam and the focus position of the illuminating beam is disclosed in, for example, U.S. Pat. No. 4,707,648.

In perhaps the majority of systems operative to control the focus of an illuminating beam relative to an optical disk it will be desired to generate both tracking and focus error signals in response to the electrical outputs of the photodetective elements. Since generation of both the focus and tracking error signals is known to generally require at least one quad photodetector, the embodiments of the present invention disclosed herein have been described with reference to quad photodetectors. However, it is also known that a focus error signal may be derived on the basis of electrical signals produced by photodetectors having only two independent photosensitive regions (bicell detectors). Accordingly, in applications requiring only the generation of a focus error signal a single photodetective element could be substituted for the first and second elements 40, 42 of the photodetector 32, and a single photodetective element could replace the third and fourth elements 44, 46. Similarly, a single photodetective element could be used in lieu of the fifth and sixth elements 50, 52 of the photodetector 34, and a single element could be substituted for the seventh and eighth elements 54, 56.

The slope of the reflectivity profile of FIG. 4 about the working point P is proportional to the sensitivity of the DFES generated by the apparatus 10. Specifically, the sensitivity of the apparatus 10 to changes in the focus of the illuminating beam I is augmented by increases in the slope of the reflectivity profile. Accordingly, it is an object of the present invention to provide a prism module 30 characterized by a reflectivity profile which is as steep as practically possible.

The shape of the reflectivity profile of FIG. 4 about the working point P may be altered by adjusting the thickness of the separation layer 38. For example, increasing the thickness of the separation layer 38 translates the angle of minimum reflectivity $A_m$ towards the critical angle $A_c$ (see FIG. 4) without affecting the value of the latter. It follows that increasing the separation layer thickness serves to increase the slope of the reflectivity profile in the vicinity of the working point P. Similarly, reducing the thickness of the separation layer 38 enlarges the angular displacement between the critical angle $A_c$ and the angle of minimum reflectivity $A_m$. The shape of the reflectivity profile of the prism module 30 may be varied in order to adjust the sensitivity of the DFES. A reasonable slope can be obtained, for example, by use of a separation layer having a thickness that is greater than one half of the wavelength of the illuminating beam I.

The value of the critical angle $A_c$ may be adjusted by varying the index of refraction of the separation layer 38 relative to that of the glass members 35, 36. Thus, adjustment of the separation layer thickness in conjunction with manipulation of the indices of refraction of the separation layer and surrounding glass members allows the prism module 30 to be fabricated in accordance with a desired reflectivity profile. It may be appreciated that the slope of the reflectivity profile about the working point P is approximately 0.16 micron$^{-1}$.

Figure 5:
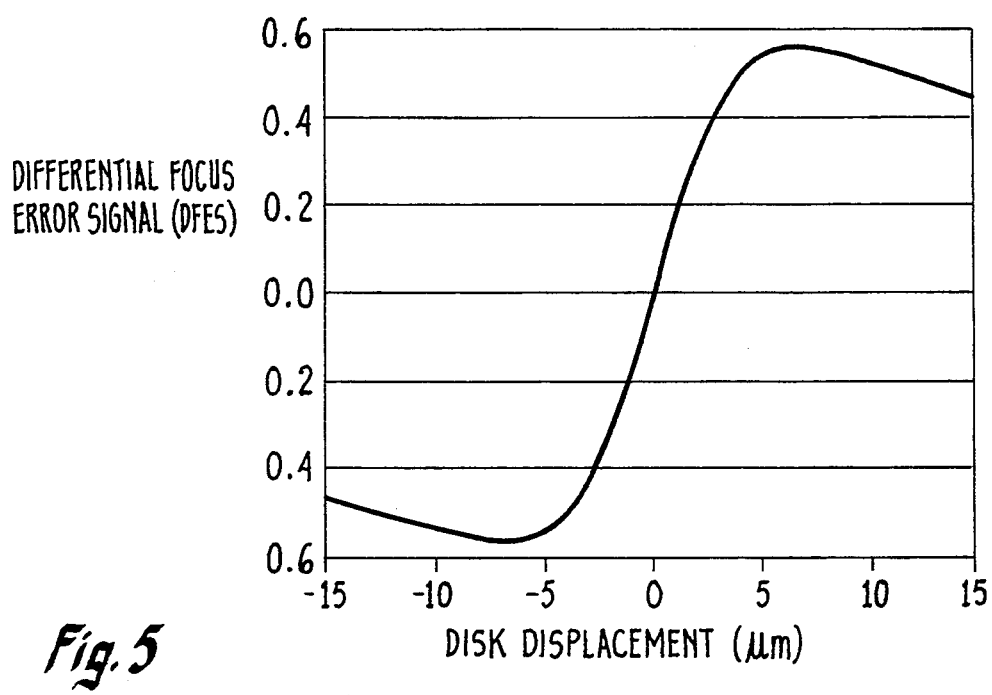
FIG. 5 is a graph of the value of a differential focus error signal generated by a preferred embodiment of the apparatus of the present invention as a function of the position of the objective lens relative to an optical disk.

FIG. 5 is a graph of the value of a normalized DFES (NDFES) generated by the apparatus 10 as a function of the deviation from the desired displacement of the objective lens 24 relative to the disk 14. NDFES is mathematically represented as follows:

$$NDFES = \frac{DFES}{(T1 + T2 + T3 + T4 + R1 + R2 + R3 + R4)}$$

Again, the data in FIG. 5 was obtained by utilizing a prism module 30 having a separation layer of index of refraction 1.38 and thickness 4.5 microns sandwiched between glass members of index of refraction 1.55, with the prism module 30 being illuminated by a servo beam of wavelength 0.78 microns. As is shown in FIG. 5, the value of the DFES is preferably zero when the desired displacement exists between the objective lens 24 and the disk 14. The sign (+ or −) of the DFES is thus indicative of whether the displacement between the objective lens and disk surface exceeds or is less than that required for proper focusing. As mentioned above, the DFES may be used to control a mechanical arrangement (not shown) disposed to adjust the separation between the objective lens 24 and the disk 14. It may be appreciated that the slope of the NDFES is approximately 0.16 micron −1 at the working point defined by 0 (zero) disk displacement.

Although the servo beam S has been represented herein to be substantially collimated when incident on the separation layer 38, the present invention is not limited to a configurations giving rise to collimated servo beams. When a convergent or divergent servo beam is utilized, inaccuracies in the focus position of the illuminating beam will alter the degree of convergence or divergence thereof. Those skilled in the art will appreciate that the focus sensing apparatus of the present invention may be utilized to generate a DFES in response to such changes in convergence or divergence.

In principle, the method described above produces reflected and transmitted beams which are fully balanced in intensity. Optimum performance of the differential focus error detection method requires the transmitted and reflected portions of the servo beam to be balanced in both cross-section and intensity. When this balance is achieved, the detector sum of the signals in each detector 32, 34 are equal, i.e., (R1+R2+R3+R4)=(T1+T2+T3+T4) and asymmetrical changes in beam intensity as described above are compensated.

During operation, however, some conditions occur in the optical disc system which can introduce imbalances in the intensity between the reflected and transmitted portions of the beam, compromising the accuracy of the error signal subsequently generated. These types of imbalances introduced in the system are not compensated for in the DFES generation. For example, a change in temperature can cause the laser to emit light of a slightly different wavelength. The change in wavelength shifts the characteristic curve of the DFTR module, thereby shifting the angle of incidence required for 50% reflectivity. This shift in the characteristic curve causes the input servo beam to be transmitted and reflected unequally, thus producing an inaccurate DFES.

The differential focus error signal produced above may be enhanced by the use of automatic gain control in order to overcome the effect of these types of asymmetrical imbalances. Automatic gain control (AGC) is applied to the DFES and used to keep the two detectors balanced in spite of changes in intensity produced by temperature variations and mechanical disturbances within the system, minimizing optical crosstalk and noise introduced when such imbalances are present.

As noted above, under ideal conditions, the detector sum signals are equal such that (R1+R2+R3+R4)=(Ti+T2+T3+T4). In operation, however, some imbalance is introduced. AGC can be used to compensate for the imbalance and enhance the DFES as follows:

$$DFES = G_R[(R1+R2)-(R3+R4)] - G_T[(T1+T2)-(T3+T4)] \quad [5]$$

where $G_R$ and $G_T$ are the instantaneous gains given by:

$$G_R = \frac{K}{(R1+R2+R3+R4)} \quad [6]$$

and $$G_T = \frac{K}{(T1+T2+T3+T4)} \quad [7]$$

in which K represents a constant.

Figure 6:
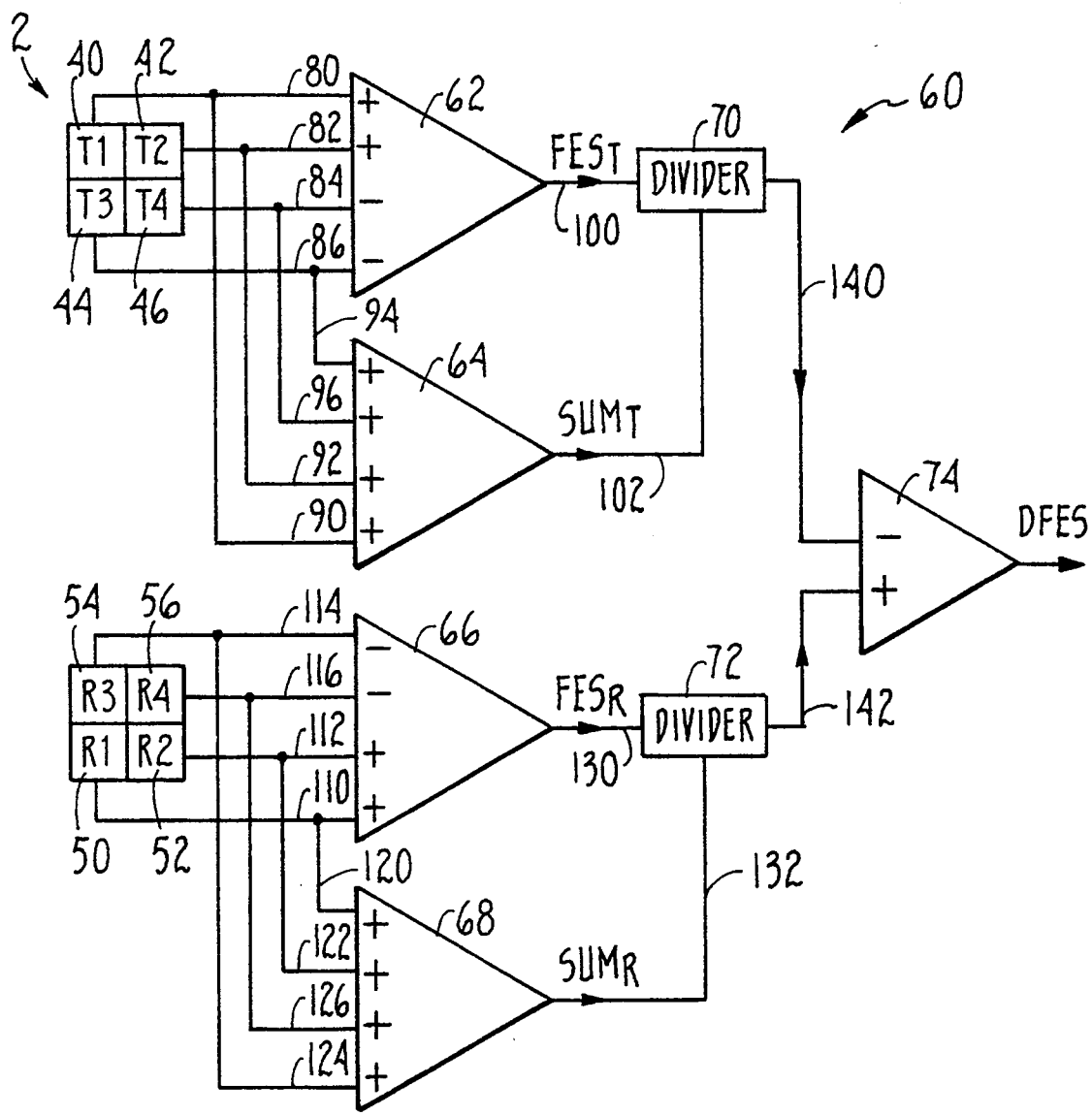
FIG. 6 is a schematic diagram of a circuit including gain control to provide an enhanced differential focus error signal.

FIG. 6 illustrates a circuit 60 designed to generate an enhanced DFES in accordance with equation [5] described above. The circuit 60 comprises first and second conventional summing amplifiers 62, 64 connected to the T signal outputs, and third and fourth conventional summing amplifiers 66, 68 connected to the R signal outputs. The outputs of the first and second summing amplifiers 62, 64 are connected to a first conventional divider circuit 70, and the outputs of the third and fourth summing amplifiers 66, 68 are connected to a second conventional divider circuit 72. The output of each divider circuit 70, 72 is connected to a conventional 2-input summing amplifier 74 which then outputs the enhanced DFES signal.

In operation, the T1 and T2 signals from the photodetective elements 40 and 42 are provided to first and second non-inverting inputs of the first summing amplifier on signal lines 80 and 82, respectively. The T3 and T4 signals from the photodetective elements 44 and 46 are provided to first and second inverting inputs of the first summing amplifier 62 on signal lines 84 and 86. The first summing amplifier 62 sums and amplifies the signals input on signal lines 80, 82, 84, and 86 to generate an FES$_T$ signal equal to $K_{T1}(T1+T2-T3-T4)$ which forms the T portion of the FES signal, where $K_{T1}$ is the amplification constant of the first summing amplifier 62.

Each of the T signals from the photodetector 32 is further provided to a non-inverting input of the second summing amplifier 64 on signal lines 90, 92, 94, and 96, respectively. The second summing amplifier 64 generates an output signal SUM$_T$ equal to $K_{T2}(T1+T2+T3+T4)$, where $K_{T2}$ is the amplification constant of the second summing amplifier 64.

The FES$_T$ and SUM$_T$ signals are input to the first divider circuit 70 on signal lines 100 and 102, respectively. The divider circuit divides the FES$_T$ signal by the SUM$_T$ signal to produce an adjusted T portion of the FES$_T$ signal given by:

$$FES_1 = \frac{K_{T1}(T1 + T2 - T3 - T4)}{K_{T2}(T1 + T2 + T3 + T4)}$$

$$= \frac{K_{T1}[(T1 + T2) - (T3 + T4)]}{K_{T2}(T1 + T2 + T3 + T4)}$$

In an arrangement similar to that of the T photodetector 32, the R1 and R2 signals from the R photodetective elements 50 and 52 are provided to first and second non-inverting inputs of the third summing amplifier 66 on signal lines 110, 112, respectively, while the R3 and R4 signals from photodetective elements 54 and 56 are provided to first and second inverting inputs of the third summing amplifier 66 on signal lines 114, 116, respectively. The third summing amplifier 66 sums and amplifies the signals input on the signal lines 110, 112, 114, and 116 to generate an FES$_R$ signal equal to $K_{R1}(R1+R2-R3-R4)$, where $K_{R1}$ is the amplification constant of the third summing amplifier, thereby forming the R portion of the FES signal.

Each of the R signals from the photodetector 34 is also provided to a non-inverting input of the fourth summing amplifier 68 on signal lines 120, 122, 124, and 126, respectively. The fourth summing amplifier sums and amplifies the R signals, generating an output signal SUM$_R$ equal to $K_{R2}(R1+R2+R3+R4)$, where $K_{R2}$ is the amplification constant of the fourth summing amplifier.

The FES$_R$ and SUM$_R$ are input to the second divider circuit 72 on signal lines 130 and 132, respectively. The second divider circuit divides the FES$_R$ signal by the SUM$_R$ signal to produce an adjusted R portion of the FES$_R$ signal given by:

$$FES_2 = \frac{K_{R1}(R1 + R2 - R3 - R4)}{K_{R2}(R1 + R2 + R3 + R4)}$$

$$= \frac{KR_1[(R1 + R2) - (R3 + R4)]}{K_{R2}(R1 + R2 + R3 + R4)}$$

The output signals FES$_1$ and FES$_2$ of the first and second divider circuits 70, 72, are input to the 2-input summing amplifier 74 on signal lines 140 and 142, respectively. The 2-input summing amplifier 74 subtracts the FES$_1$ signal from the FES$_2$ signal to generate the resultant DFES signal given by:

$$DFES = \frac{C\{K_{R1}[(R1 + R2) - (R3 + R4)]\}}{K_{R2}(R1 + R2 + R3 + R4)} -$$

-continued
$$\frac{C\{K_{T1}[(T1 + T2) - (T3 + T4)]\}}{K_{T2}(T1 + T2 + T3 + T4)}$$

where C is the amplification constant of the 2-input summing amplifier 74. Setting the value of the constant $C(K_{R1})/K_{R2} = C(K_{T1})/K_{T2} = K$, the equation can be written as equation [5] previously described:

$$DFES = G_R[(R1+R2)-(R3+R4)] - G_T[(T1+T2)-(T3+T4)]$$

where $G_R$ and $G_T$ are the gain factors given by equations [6] and [7] above. The resulting DFES signal generated by the summing amplifier 74 is then applied to well-known control circuitry which adjusts the position of the objective lens relative to the surface of the disk.

The inventive focus sensing apparatus has thus been shown to overcome the disadvantages inherent in other focus detection systems by providing reflected and transmitted beams of substantially similar shape and intensity from which a focus error signal may be differentially derived. The focus sensing technique disclosed herein nonetheless retains features present in certain related focus detection systems such as low sensitivity to mechanical vibration, decreased sensitivity to disk tilt, and the potential for thermal stability.

Although the invention has been described herein as used in particular applications associated with focus sensing, the invention applies to the more general field of beam geometry evaluation. It is not intended that the scope of the invention be limited to the specific embodiments described herein, since the invention finds application in the evaluation of radiation beam geometry generally, regardless of what defines this beam geometry.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A focus sensing apparatus comprising:
   a source of radiation energy;
   means for focusing radiation from said source upon an object to be reflected therefrom;
   means for separating at least a portion of radiation reflected by said object into transmitted and reflected beams;
   means for detecting the respective intensities of said transmitted and reflected beams;
   means for producing a transmitted focus error signal based at least in part on said detected intensity of said transmitted beam;
   means for producing a reflected focus error signal based at least in part on said detected intensity of said reflected beam;
   means for adjusting said transmitted focus error signal to compensate for disturbances in said optical system;
   means for adjusting said reflected error signal to compensate for disturbances in said optical system; and
   means for combining said transmitted focus error signal and said reflected focus error signal to produce a differential focus error signal.

2. The focus sensing apparatus defined in claim 1, wherein said means for detecting said intensities comprises a first photodetector channel which detects the intensity of said transmitted beam and a second photodetector channel which detects the intensity of said reflected beam.

3. The focus sensing apparatus defined in claim 2, wherein said means for adjusting comprises a circuit which balances the intensities of said first and second photodetector channels.

4. The focus sensing apparatus defined in claim 3, wherein said circuit comprises:
   a first summing amplifier which receives the output of said first photodetector channel and generates an output signal indicating the focus condition of said transmitted beam;
   a second summing amplifier which receives the output of said first photodetector channel and generates an output signal indicating the intensity of said transmitted beam;
   a third summing amplifier which receives the output of said second photodetector channel and generates an output signal indicating the focus condition of said reflected beam;
   a fourth summing amplifier which receives the output of said second photodetector channel and generates an output signal indicating the intensity of said reflected beam;
   means for dividing said output signal from said first summing amplifier by said output signal from said second summing amplifier, thereby generating a first compensated focus error signal indicating the compensated focus condition of said transmitted beam;
   means for dividing said output signal from said third summing amplifier by said output signal from said fourth summing amplifier, thereby generating a second compensated focus error signal indicating the compensated focus condition of said reflected beam; and
   means for subtracting said first compensated focus error signal from said second compensated focus error signal to obtain a compensated differential focus error signal indicating the focus condition of said radiation reflected by said object.

5. A method of detecting the focus condition of radiation energy in an optical system comprising the steps of:
   focussing said radiation upon an object;
   separating at least a portion of radiation reflected by said object into transmitted and reflected beams;
   detecting the intensities of said transmitted and reflected beams;
   adjusting said detected intensities to compensate for disturbances in said optical system;
   generating a first signal indicative of the detected intensity, as adjusted, of said transmitted beams;
   generating a second signal indicative of the detected intensity, as adjusted, of the reflected beam; and
   generating a differential focus error signal based in part on said first and second signals.

6. The method of claim 5, wherein the step of adjusting said detected intensities comprises balancing the intensities of said transmitted and reflected beams.

7. A focus sensing apparatus comprising:
   a source of radiation energy;
   a lens which focuses radiation from said source upon an object to be reflected therefrom;
   a beam separation module which receives at least a portion of radiation reflected by said object and separates said portion into transmitted and reflected beams;
   photodetectors which receive said transmitted and reflected beams, said photodetectors detecting the intensities of said transmitted and reflected beams and generating output signals representative of said intensities; and
   circuitry responsive to said output signals of said photodetectors, wherein said circuitry adjusts said output signals to compensate for disturbances in said optical system.

8. A focus sensing apparatus comprising:
   a source of radiation energy;
   a lens which focuses radiation from said source upon an object to be reflected therefrom;
   a beam separation module which receives at least a portion of radiation reflected by said object and separates said portion into transmitted and reflected beams;
   a first photodetector channel which receives said transmitted beam and generates a plurality of output signals;
   a second photodetector channel which receives said reflected beam and generates a plurality of output signals;
   a first summing amplifier which receives said plurality of output signals from said first photodetector channel and generates an output signal indicating the focus condition of said transmitted beam;
   a second summing amplifier which receives said plurality of output signals from said first photodetector channel and generates an output signal indicating the intensity of said transmitted beam;
   a third summing amplifier which receives the output of said second photodetector channel and generates an output signal indicating the focus condition of said reflected beam;
   a fourth summing amplifier which receives the output of said second photodetector channel and generates an output signal indicating the intensity of said reflected beam;
   a first divider circuit which divides said output signal from said first summing amplifier by said output signal from said second summing amplifier, thereby generating a first compensated focus error signal indicating the compensated focus condition of said transmitted beam;
   a second divider circuit which divides said output signal from said third summing amplifier by said output signal from said fourth summing amplifier, thereby generating a second compensated focus error signal indicating the compensated focus condition of said reflected beam; and
   a fifth summing amplifier which subtracts said first compensated focus error signal from said second compensated focus error signal to obtain a compensated differential focus error signal indicating the focus condition of said radiation reflected by said object.

9. The focus sensing apparatus defined in claim 1, wherein the source of radiation is comprised of a laser.

10. The focus sensing apparatus defined in claim 1, wherein the means for separating at least a portion of radiation including a beam separation module comprised of a separation layer, having a substantially uniform index of refraction, interposed between a first optical member and a second optical member.

11. The focus sensing apparatus defined in claim 1, wherein said reflected beam and said transmitted beam have substantially equal intensity when said radiation source is substantially in focus on said object.

12. The focus sensing apparatus defined in claim 1, wherein said means for detecting the intensities of said transmitted and reflected beams respectively comprises a first and a second photo detector which generate voltage signals representative of the detected intensities of the transmitted and reflected beams.

13. The focus sensing apparatus defined in claim 12, wherein said means for generating a differential focus error signal comprises an electronic circuit receiving said voltage signals from both said first and second photo detectors to produce a differential focus error signal.

14. A focus sensing apparatus comprising:
a source of radiation energy;
an objective lens for focusing said radiation energy upon an object;
a beam separation module for separating at least a portion of the light reflected by said object into transmitted and reflected beams;
a beam splitter for directing at least a portion of said reflected energy into said module;
a detector arrangement for receiving said transmitted beam and said reflected beam and for generating in response thereto a first signal indicative of a characteristic of said transmitted beam and a second signal indicative of a characteristic of said reflected beam; and
a circuit receiving both said first and second signals from said detector arrangement, for generating a focus error signal based on both said first and second signals.

15. The focus sensing system of claim 14, wherein said first signal represents a transmitted focus error signal and said second signal represents a reflected focus error signal and said circuit is further configured to adjust said transmitted focus error signal and said reflected error signal to compensate for disturbances in said optical system.

16. The focus sensing apparatus of claim 14, wherein said source of radiation is comprised of a laser.

17. The focus sensing apparatus of claim 14, wherein said beam separation module is configured so that said reflected beam and said transmitted beam have equal intensities when said radiation is focused on said object.

18. The focus sensing apparatus of claim 14, wherein said beam separation module is comprised of a separation layer, having a substantially uniform index of refraction, interposed between a first optical member and a second optical member.

19. The focus sensing apparatus of claim 18, wherein energy reflected from the object impinges on said separation layer at an angle of incidence having an angular value within a selected continuous range of angular values between a critical angle of a first angular value and a next adjacent angle of minimum reflectance having a second angular value, wherein said second angular value is less than said first angular value.

20. The focus sensing apparatus of claim 19, wherein said detector arrangement is comprised of a first photodetector channel which generates an output signal indicating the focus condition of said transmitted beam and a second photodetector which generates an output signal indicating the focus condition of said reflected beam.

21. The focus sensing apparatus of claim 20, wherein said circuit comprises:
a first summing amplifier which receives the output of said first photodetector and generates an output signal indicating the focus condition of the transmitted beam;
a second summing amplifier which receives the output of the first photodetector and generates an output signal indicating the intensity of said transmitted beam;
a third summing amplifier which receives the output of said second photodetector and generates an output signal indicating the focus condition of said reflected beam;
a fourth summing amplifier which receives the output of said second photodetector and generates an output signal indicating the intensity of said reflected beam;
a first divider which divides a characteristic of said output signal from said first summing amplifier by a characteristic of said output signal from said second summing amplifier, thereby generating a first compensated focus error signal indicating the compensated focus condition of said transmitted beam;
a second divider which divides a characteristic of said output signal from said third summing amplifier by a characteristic of said output signal from said second compensated focus error signal to obtain a compensated differential focus error signal indicating the compensated focus condition of said reflected beam; and
an amplifier circuit configured to subtract said first compensated focus error signal from said second compensated focus error signal to obtain a compensated differential focus error signal indicating the focus condition of said radiation reflected by said object.

22. A method of detecting the focus condition of radiation energy in an optical system comprising the steps of:
focussing said radiation upon an object;
separating at least a portion of radiation reflected by said object into transmitted and reflected beams;
detecting the intensity and distribution of said transmitted and reflected beams;
generating a transmitted focus error signal based on the detected intensity of said transmitted beam;
adjusting said transmitted focus error signal to compensate for disturbances in said optical system;
generating a reflected focus error signal based on the detected intensity of said reflected beam;
adjusting said transmitted focus error signal to compensate for disturbances in said optical system; and
generating a final focus error signal based on said adjusted transmitted focus error signal and on said adjusted received focus error signal.

23. The method according to claim 22, wherein the step of adjusting said transmitted focus error signal and the step of adjusting said reflected focus error signal are respectfully comprised the steps of normalizing said transmitted focus error signal and normalizing said reflected focus error signal.

* * * * *